(12) United States Patent
Hsu

(10) Patent No.: US 6,741,744 B1
(45) Date of Patent: May 25, 2004

(54) COMPILIABLE LANGUAGE FOR EXTRACTING OBJECTS FROM AN IMAGE USING A PRIMITIVE IMAGE MAP

(76) Inventor: Shin-yi Hsu, 2312 Hemlock La., Vestal, NY (US) 13850

(*) Notice: Subject to any disclaimer, the term of this patent is extended or adjusted under 35 U.S.C. 154(b) by 0 days.

(21) Appl. No.: 09/293,645

(22) Filed: Apr. 17, 1999

Related U.S. Application Data

(63) Continuation-in-part of application No. 08/759,280, filed on Dec. 2, 1996, now abandoned.

(51) Int. Cl.$^7$ .................................................. G06K 9/72
(52) U.S. Cl. ..................... 382/229; 382/113; 382/169; 382/190; 382/276; 382/305; 706/45; 707/6
(58) Field of Search ................................ 382/113, 165, 382/173, 276, 190, 191, 195, 197, 201, 203, 243, 305, 306, 209, 169; 706/50, 45; 707/1–6, 100, 102, 104.1; 302/229

(56) References Cited

U.S. PATENT DOCUMENTS

| | | | | |
|---|---|---|---|---|
| 4,663,726 A | * | 5/1987 | Chand et al. | 700/252 |
| 5,018,218 A | * | 5/1991 | Peregrim et al. | 382/103 |
| 5,164,897 A | * | 11/1992 | Clark et al. | 705/1 |
| 5,323,311 A | * | 6/1994 | Fukao et al. | 704/8 |
| 5,631,970 A | * | 5/1997 | Hsu | 348/119 |
| 6,029,165 A | * | 2/2000 | Gable | 707/31 |
| 6,057,858 A | * | 5/2000 | Desrosiers | 345/467 |

OTHER PUBLICATIONS

Soffer et al., (Retrieval by content in symbolic –image database, SPIE vol. 2670, p. 144–155) 1/96.*
Hermes et al., (Image Retrieval for information systems, SPIE vol. 2420 pp. 394–405) 2/95.*

* cited by examiner

*Primary Examiner*—Timothy M. Johnson
*Assistant Examiner*—Sheela Chawan
(74) *Attorney, Agent, or Firm*—Salzman & Levy

(57) ABSTRACT

The invention features a method wherein a recognition environment utilizes pseudo-English as a programming language to extract simple and complex objects with image- and/or map-data as inputs. Based on this human/computer interface in which pseudo-English is a programming language, the object-recognition system has three major logic modules: (1) an input data module; (2) an information-processing module, coupled with the above-noted human computer interface (HCI) module; and (3) an output module that has a feedback mechanism back to the main information-processing and the input-data module. A physical phenomenon (i.e., one that is visible, audible, tactile, etc.) is analyzed by the information-processing module to determine whether it is susceptible to description or articulation. If not, the phenomenon is matched or compared, via the output module, to a known articulatable, physical-phenomenon model and recognizable features are extracted.

16 Claims, 9 Drawing Sheets

(6 of 9 Drawing Sheet(s) Filed in Color)

 
Figure 1                                   Figure 3

```
SEEK  target BMP BRDM2 BTR60 M1 M109 M113 M151 M2 M35 M36 M60 T72 UAZ ZIL
      CFLD Pine1 Pine2 MCP PHcf PHp1 PHp2 Zero0 One1 Two2 Three3 Four4 Five5
      Six6 seven7 eight8 nine9;

Region Target: [#1 size 2 = (100 20000)] [#1 Tone 2 = (1 255)];

REGION Zero0   : [IS Target] [#1 SOLID MODEL ALL = Zero0    (0 MAX) ] ;
REGION One1    : [IS Target] [#1 SOLID MODEL ALL = One1     (0 MAX) ] ;
REGION Two2    : [IS Target] [#1 SOLID MODEL ALL = Two2     (0 MAX) ] ;
REGION Three3  : [IS Target] [#1 SOLID MODEL ALL = Three3   (0 MAX) ] ;
REGION Four4   : [IS Target] [#1 SOLID MODEL ALL = Four4    (0 MAX) ] ;
REGION Five5   : [IS Target] [#1 SOLID MODEL ALL = Five5    (0 MAX) ] ;
REGION Six6    : [IS Target] [#1 SOLID MODEL ALL = Six6     (0 MAX) ] ;
REGION Seven7  : [IS Target] [#1 SOLID MODEL ALL = Seven7   (0 MAX) ] ;
REGION Eight8  : [IS Target] [#1 SOLID MODEL ALL = Eight8   (0 MAX) ] ;
REGION Nine9   : [IS Target] [#1 SOLID MODEL ALL = Nine9    (0 MAX) ] ;

Seek Seventeen17 Twenty20;

Region Seventeen17: [is One1] [left seven7]
                   [approaches 50 seven7] ;

Display Seventeen17=blue seven7=cyan;

Top title = "Target: [#1 Size 1 = (50 200000)]" ;
Bottom Title = "Display Seventeen=yellow seven=cyan" ;

Region Twenty20: [is Two2] [left zero0]
                [approaches 50 zero0] ;

Top title = "Display Seventeen=yellow seven=cyan " ;
Bottom Title = "Display Twenty20=blue zero=cyan" ;

Display Seventeen17=yellow seven7=cyan;
Display Twenty20=yellow zero0=cyan;

BW 1 Display Seventeen17=yellow seven7=cyan;
BW 1 Display Twenty20=yellow zero0=cyan;
```

Figure 5

COMPILIABLE LANGUAGE FOR EXTRACTING OBJECTS FROM AN IMAGE USING A PRIMITIVE IMAGE MAP

This application is a CIP of Ser. No. 08/759,280 filed on Dec. 2, 1996 and now abandoned.

FIELD OF THE INVENTION

The present invention pertains to a method of object recognition and, more particularly, to a method of object recognition that uses a human-like language, based on the vocabularies used in photointerpretation, to write solution algorithms.

BACKGROUND OF THE INVENTION

In the art of object recognition, one usually extracts an object with image and/or map data by using one of three major methods: (1) a manual method in which an analyst extracts an object by using the human visual system, (2) an automated method in which the analyst relies totally on a machine system to perform the task, and (3) an interactive method in which the analyst determines a final decision, while a machine plays an assistant role.

Using a manual mode, an analyst does not need to employ a computer to do anything except to display an image.

In employing an automated system, once the data is entered into the machine, a machine system extracts the intended object. The analyst is merely a receiver of the data-processing results. In the event that the analyst is dissatisfied with the performance of the machine system, necessary changes can be made to the solution algorithms. In this automated mode, the analyst still has nothing to do with either the machine or the means by which objects are extracted.

In a conventional, interactive mode of information processing, the level of interaction between an analyst and a machine system can vary greatly. The least amount of interaction occurs when a machine system provides a set of solutions to the analyst, and the analyst selects or rejects one or more of the proffered solutions. On the other hand, the analyst can intensively interact with the machine by employing the following: (1) pre-processing image data by using a set of functions provided by the machine systems; (2) analyze the content of the scene by using a set of functions provided by the machine systems; (3) by utilizing the information provided in the aforementioned options, performing a set of object extraction options; and (4) evaluating each result and then selecting or rejecting a result.

In a conventional system utilizing intense interaction, an analyst is still either a mere operator or, at best, an effective, efficient user of the machine system. In other words, under these conditions, no matter how good the analyst is in the extraction or recognition of an object, conceptualized "algorithms" cannot be converted into a computer-workable program.

Conventional feature and object extraction for mapping purposes is based on high resolution panchromatic images supplemented by color imagery. A feature boundary, such as the contact zone between a forested area and a cultivated field, is determined by using standard photo-interpretation principles, such as a Tone principle, a Texture principle, a Size principle, a Shape principle, and so on, based on one single image. The use of multiple images, such as a system with three graytone images representing the near infrared spectrum, the red spectrum, and the green spectrum, in determining an object boundary can be very confusing and time-consuming. Therefore, to be helpful, these multispectral imagery data sets must be converted to a single-band scene serving as a base image map (IM) for manually-based feature extraction.

In the past 30 years or more, image processing and pattern recognition have been centered on extracting objects using simple and complex algorithms within an image of appropriate dimensions, such as 128×128, 256×256, 512×152 and 1024×1024 pixels. It is extremely rare for a complex algorithm to extract an object from a scene larger than 2048× 2048 pixels, in view of the fact that historically even a workstation has a limited memory capacity to handle large images.

From the above discussion, it is clear that there exists a gap in the concept of scale in a physical space, and a gap in formation processing between the mapping community and pattern recognition scientists. In essence, cartographers deal with space in degrees of longitude and latitude, whereas image processing scientists think in terms of objects in a scene of 512×512 pixels. Among other objects of this invention, this conceptual and information processing gap is to be bridged.

The present invention is an innovative object-recognition system that divides objects into two broad categories, viz., wherein an analyst can articulate, after examining the scene content; how he or she would extract an object, and, secondly, wherein an analyst cannot articulate how to discriminate an object against other competing object descriptors, after examining the scene or a set of object descriptors (e.g., a spectral signature or a boundary contour).

In the first case, where an analyst is able to articulate the extraction of the objects, the proposed solution is to employ a pseudo-human language, including, but not limited to, pseudo-English as a programming language. The analyst can communicate with a machine system by using this pseudo-human language, and then inform the machine how he or she would extract a candidate object without having to rely on a "third-party" programmer.

In the second case, where an analyst is unable to articulate the extraction of an object, the proposed solution is to use an appropriate matcher with a matching library to extract the candidate object, and then pass it over to processors employed in the first-category sphere. Once an extracted object is passed over to the first environment, this object becomes describable by using the proposed pseudo-human language. Thus, it can be combined with other "existing objects" to extract still further objects. The final result, then, is the extraction of a set of complex objects or compound objects.

In the past 50 years, photointerpreters have been taught to use the principles governing the following aspects in recognizing an object: (1) tone or spectrum principles; (2) texture (spatial variation of tones) (3) size; (4) shape; (5) shadow (detection of vertical objects); (6) pattern (geometry and density) (7) associated features (contextual information); and (8) stereoscopic characteristics (height), if available.

From these principles based on the human visual system, an object can exist in a number of forms, as shown below in Table I.

TABLE 1

Object Form and Its corresponding Major Extraction Principle Used By A Photo-interpreter or Image Analyst

| Object Existing as: | Major Extraction Principles: |
|---|---|
| a. One pixel (sub-pixel) object | Tone or multi-spectral data |
| b. One-pixel region | Tone and size |
| c. Multiple, one-pixel object | Tone, pattern |
| d. One multiple-pixel region | Tone, texture, size, shape |
| e. Multiple contiguous regions | Tone, texture, size, shape, associated features |
| f. Multiple discrete regions | Tone, size, texture, pattern, associated features |
| g. Association with Others | Associated features, tone, size, texture, etc. |

From Table I data, it can be inferred that a spectral-matching-alone system can extract only one of the seven object types, i.e., (a). A shape-alone system can extract only two of the seven object types, i.e., (b) and (d).

The proposed system of this invention is intended for extracting all seven types of objects by using image and map data, such as synthetic aperture radar (SAR), and multispectral and other types of sensory data, with the assumption that appropriately matching libraries are available. For example, such libraries are readily available: (1) hyperspectral library of various material types; (2) ground vehicle library for FLIR (forward-looking infrared) applications; and (3) ground vehicle library for LADAR (laser radar) applications.

Using these libraries, the method of this invention first extracts single-pixel and single-region-based objects, and then "glues" them together to form multi-object-based object complexes.

Table II below illustrates this two-stage, object-extraction approach.

The uniqueness of this inventive method lies in using a pseudo-human language (such as a pseudo-English-based programming language), compatible with an interpreters' language, to perform this "object-gluing" process. For example, to extract a complex object having two subparts, such as an engine and a body, the following Table can be utilized.

TABLE II (Equation 1)

Line 1 Seek Part_1 Part_2 Whole;
Line 2 Region Part_1: [Tone 1 = (200 255)];      /* a hot engine*/
Line 3 Region Part_2: [Size 1 = (500 800)][Elongation 1 = (0 6000)];    /* Size & Shape */
Line 4 Region Whole: [is Part_2] [touches Part_1);      /* two parts are glued together */
Line 5 Display Whole = magenta;      /* the extracted object is displayed */

In line 1 of Equation 1, both Part_1 and Part_2 are extracted by using a rule-based system in the inventive objective-recognition system. These two objects can also be extracted by using a matching library; in this case, though, Lines 2 and Line 3 in Equation 1 will not be necessary, however they must be extracted before Equation 1 is executed.

Another innovative feature of the system, therefore, is that it allows one to integrate a matcher-based classifier with a rule-based classifier within one image-exploitation environment.

When asked how a conclusion is derived for a given image complex in an area of interest (AOI) that may contain a target (or is, in fact, a target of a certain type), a photo-interpreter would most likely give an answer in terms of a combination of these photointerpretation keys listed in the second and third equation, column II Table III below, or as the following:

> 1. The area is a small region—a size criterion. 2. The area contains a bright spot—a tone criterion. 3. It is not a vegetated region—an associated feature principle. 4. It is close to a trail or a road—an associated feature principle.   Equation (2)

TABLE III

Model For Extracting Seven Object Types Noted in Table I

| Object Existing as: | To Extract Stage 1 by Matching Processes | To Extract Stage 2 by "Gluing" Processes |
|---|---|---|
| a. One pixel (sub-pixel) object | Tone or multispectral data | |
| b. One-pixel Region | Tone and Size | |
| c. Multiple One-pixel Object | | Tone, pattern |
| d. One Multiple-pixel Region | Tone, texture, size, shape | |
| e. Multiple Contiguous Region | | Associated feature |
| f. Multiple Discrete Regions | | Pattern |
| g. Association with Others | | Associated features |

Equation 2 indicates that the photointerpreter is capable of articulating a target-extraction process in terms of two levels of sophistication: (1) how a target complex is different from its background; and (2) how a given target is different from the other targets.

> This group of targets is denotable as "describable or articulatable by using a photointerpreter-based human language."(Equation 3)

In many cases, it is difficult to articulate by using a human language how one spectral curve is different from another, or how to match one observed boundary contour with a set of contours that is stored in a shape library. However, one can obtain a correct match by using a matching algorithm that is executed by a computer.

This group of targets can be denoted as "cannot be articulated with a human language, but extractable by using a computer-based, matching algorithm". (Equation 4)

In certain cases, a target complex becomes describable via a human language, after a computer-based matcher has identified the internal features (parts) of the target. For example, if a camouflage net comprises three kinds of materials (e.g., green-colored material, tan-colored and yellow-colored), one can identify each pixel by its material type and output the results in terms of a three-color decision map. The target complex thus becomes a describable object, such as:

(1) The area of interest contains three types of material, viz., green-, tan- and yellow-color based; this is a tone principle.
(2) The three colors touch one another; this is an associated-feature principle, as well as a texture principle.
(3) The sum of these pixels is in an interval of 15-to-20 pixels; this is a size principle.

This group of targets can be denoted as "describable or articulatable, after a classification process is completed with a matching library". (Equation 5)

To extract objects and features for mapping purposes, it is a common practice by cartographers to use high resolution panchromatic orthophotos—imagery with a constant scale over the entire scene—as the source. These digital orthophotos usually cover a large geographic region that uses 7.5 minutes in longitude and latitude directions as one basic spatial unit. In this spatial framework, it is not uncommon to find an orthophoto that covers a spatial extent of one-half degree in both longitude and latitude directions. How can such a geographic dimension be translated into image sizes?

Consider an approximate length for one degree on the earth coordinate system: 110 kilometers. One half of a degree is approximately 55 km. If a panchromatic image has a linear spatial resolution of 5 meters per pixel, a square region of one half of a degree is equivalent to 11,000×11,000 pixels. A one-degree region on the earth is covered by a scene of 22,000×22,000 pixels at the linear resolution of 5 meters per pixel. It is not unusual for a cartographer to extract features from a one-degree scene. In digital image processing, on the other hand, a unit of analysis is usually set at the level of 512 by 512 pixels or 1024 by 1024 pixels. In other words, it is rare that a sophisticated feature extraction algorithm is applied to scene of 2024 by 2024 pixels.

Using the human visual system as means for object extraction, a cartographer can handle a one-degree scene without much difficulty. Since an object like a runway has distinct spatial base and dimension, to extract it from an image, the cartographer must have destroyed a tremendous amount of information, at the same time creating additional information that does not exist in the image. This invention simultaneously creates and destroys information for object extraction in images by using a digital computer, just as a sculptor creates a work of art while simultaneously removing undesired material.

The present invention proposes a communication means between an analyst and a computer, or, a human computer interface, in the form of a pseudo-human-based programming language, with which a photo-interpreter can extract the two types of target complexes.

In addition to serving as an interface module between an analyst and a computer, this language functions in two significant ways: (1) it is a vehicle for one to capture and preserve the knowledge of the human analysts; and (2) it is an environment in which an analyst can organize his or her image-exploitation knowledge into computer-compilable programs, e.g., it is an environment for knowledgeably engineering automatic, object-recognition processes.

Table IV summarizes the above-discussed target extraction process with a pseudo-English language as a programming language.

TABLE IV

Model for Using a Pseudo-English-based Human Computer Interface (HCI) as an Environment of Object Recognition

| Target Types | Pseudo-English HCI | Target Extraction Process-Type |
|---|---|---|
| Type 1: | Describable with English | Stage Ia Analysis with Rule-based Systems |
| Type 2: | Extractable with a Matcher | Stage Ib Analysis with a Matching Library |
| Type 3: | Describable after Matching | Stage 2 Analysis with Two Stage-1 Analyses |

The inventive system is based upon the model shown in Table IV. The target extraction philosophy of this invention can also be summarized in Table V by using the model of Table IV as its base.

TABLE V (Equation 6)
A General Object Extraction Model
for Inventive Object Recognition System (1) If one can articulate via a human language as to how to extract a target, convert these rules into a compilable program with pseudo-English as a programming language.
(2) If one cannot articulate via a human language as to how to extract a given target, use a matcher to perform object recognition, provided that a matching library is available
(3) For a complex target, use the result of a matcher to create a describable pattern, and then extract it by using a pseudo-English-based, rule-based system.

DISCUSSION OF RELATED ART

Schutzer (1985) in his article entitled, "The Tools and Techniques of Applied Artificial Intelligence" in Andriole (1985 ed.), listed LISP and PROLOG as applicable, artificial-intelligence (AI) languages. The inventive language differs from these.

First (as noted by Schutzer), LISP as a short form of "List Processor" is primarily designed as a "symbol-manipulation language". While it is a powerful language, it differs significantly from the inventive language form illustrated in Equation 1 in that each system has its own, distinct vocabulary and syntax.

The second major AI language discussed by Schutzer, PROLOG, denotes "programming in logic". The most distinct feature of PROLOG is that in solving a program therewith, the user states the problem, but not the procedures by which the problem is to be solved. In the inventive system, the analyst must specify the exact procedures as to how a specific object is to be defined (as illustrated in Equation 1), in which a third object is extracted, because the first object "touches" the second object.

Conventional computing languages also include assembler, FORTRAN, PASCAL, C, C++, etc. All of these languages are machine-oriented, rather than human oriented. Thus, these languages are rarely used for man-machine interface purposes. In contrast, as discussed earlier, the inventive language is a bona fide man-machine interface module.

The conventional, man-machine interface means is based on a so-called graphic user interface (GUI). A GUI is generally characterized by a process with which one "points and clicks" a graphic iron to initiate a specific data-processing task. A simple GUI allows one to execute a program by "pointing and clicking" one item at a time. A sophisticated GUI allows one to build a system of processing modules, using a graphic representation, by connecting multiple sub-modules. This process is similar to using C-Shell to link a set of processors.

The inventive human computer interface differs from a conventional GUI in three significant ways:

(1) No matter how sophisticated a conventional GUI is, it does not create additional information; in contrast, the inventive system creates information by integrating multiple sets of input sources.

(2) In the inventive programming-language system, an analyst creates a solution algorithm at the micro level, in addition to the system level; in contrast, with a conventional GUI, the analyst can manipulate only at the module level.

(3) Lastly, a conventional GUI is not designed for knowledge engineering; in contrast, the inventive system is designed primarily for knowledge engineering and knowledge capture.

The advantages of one solution system over another depend largely on the degree of difficulty of a problem. For example, if the task is simple enough, any solution algorithm can solve the problem. In this situation, one cannot detect the advantage of one system over the other. However, if a problem is extremely complex, the advantage of a solution system, if any, over its competitor will loom large. Since object extraction with image- and/or map-data is extremely complex, the advantages of the inventive system over the other systems are significant.

Using a linguistic approach to solve a spatial-analysis problem is not new. For example, Andriole (1985) showed how researchers have used natural language for applications in artificial intelligence. Additional, expert, systems-based examples can be obtained from Hayes-Roth, Waterman and Lynat (1983).

Indeed, "the conceptualization of space and its reflection in language" is a critical research agenda item for NCGIA (National Center for Geographic Information Analysis), particularly with respect to Initiative 2 (Mark et. al., 1989; Mark, 1992; Egenhofer and Frank, 1990; Egenhofer, 1994).

The papers by NCGIA-associated researchers show that a large number of spatial-analysis problems can definitely be articulated by using certain English words that establish spatial relationships among objects. For example, Egenhofer (1994) has developed mathematical rules for establishing nine spatial relationships between two spatially-contiguous objects; these relationships have their counterparts in English, such as "meet", "inside", "covers", "covered by". To articulate a spatial-analysis problem by employing these spatial-relationship terms, an example follows.

One of the famous objects in the Washington, D.C., region is the Pentagon. A goal is to extract this object, using LANDSAT™ data. It is well-known that the Pentagon has a grassy region at the center of the building, called "Ground Zero". Suppose that this grass-based region is extracted by using a greenness, transformed band, derived from the TM data. Denote this object as "Courtyard". Secondly, using TM's thermal band (#6) data, one can extract Pentagon in terms of a "hot building". Therefore, one can define the Pentagon in terms of a unique, spatial relationship between the "Courtyard" and the "hot building" as follows:

(Equation 7)

Pentagon: [is Hotbuilding][outside Courtyard][within 15 Courtyard];

Equation 7 introduces three key words and/or phrases: "is", "outside" and "within 15". Using these three key words and/or phrases, one can articulate that, in order to extract "Pentagon", one needs to associate a hot building with a grassy courtyard, one object is inside or outside of the other, etc.

In a problem-solving setting, one usually writes a solution algorithm in pseudo-code first, and then has a programmer convert the pseudo-code into a compilable program that is written in a standard computer-language, such as C or C++. The pseudo code comprises a set of English words or phrases that specify the process by which a particular problem is to be solved. The solution algorithm is generally referred to as a rule set. For the inventive system to work, the vocabularies in the rule set must be "callable" functions. Using Equation 7 as an example, "is" "outside" and "within x" are callable functions.

In many spatial-analysis scenarios (such as locating a facility that meets certain spatial constraints), one can easily write a conceptual algorithm or rule set for it. However, executing this rule set by using a computer can be either impossible or could take a lot of man-hours to code by using a standard computer-language. Therefore, for the inventive system to be workable, the rule set one composes must follow a certain "legal" format so that it is compilable. For example, Equation 7 above is legal in terms of the syntax and key words; however, it is not compilable.

TABLE VI (Equation 8)
An IMaG Compilable Program

Line 1 Bands = 2;          /* Two layers as input data */
Line 2 Initial Cutoff = 5;
Line 3 Segmentation Type = Local; /* Scene segmentation is performed */
Line 4 Seek Courtyard Hotbuilding Pentagon; /*Objects are defined as follows */
Line 5 Region Courtyard: [Tone 1 = (30 255)][Size 1 = (15 200)]; /* 1 for Layer 1 */
Line 6 Region Hotbuilding: [Tone 2 = (150 255)] [Size 2 = (50 300)]; 2 is Layer 2 */
Line 7 Region Pentagon: [is Hotbuilding] [outside Courtyard] [within 15 Courtyard];
Line 8 Display Pentagon = magenta; /* Extracted object is displayed */

Table VI (Equation 8) is a compilable program, because it meets all of the requirements therefor. Line 7 of Equation 8 is exactly Equation 7. Therefore, Equation 7 is equivalent to a subroutine in Equation 8.

The last requirement of the inventive approach is that a software environment that is capable of accepting Equation 8 as a computer program must exist. Otherwise, Equation 8 is merely a conceptual algorithm, instead of a researchers to think integration among GIS, remote sensing and geography in two levels: 1—technological integration; and 2—conceptual integration. Dobson suggested that conceptual integration is much more difficult than technical integration.

While Dobson (1993, p. 1495) predicted that "technical integration will remain an illusive target not likely to be achieved for decades, " the present invention proposes that, by using pseudo-English as a programming language, one can shorten this predicted timetable from decades to years, and make "technological integration" an integral part of "conceptual integration".

International Publication No. WO 93/22762, by William Gibbens REDMANN et al., discloses a system for tracking movement within a field of view, so that a layman can conduct the performance of a prerecorded music score by means of image processing. By analyzing change in centers of movement between the pixels of the current image and those of previous images, tempo and volume are derived.

The REDMANN reference is concerned only with pixels. The change of pixels denote movement, and therefore are dispositive of the orchestration or baton response. REDMANN does not seek to recognize one or more objects within an image. Moreover, REDMANN requires movement of features in an image in order to perform its function. Pixels are compared with one another to discover movement of a baton. However, this simple change in pixel orientation, denoting movement of the baton, is not a sophisticated analysis of an image for purposes of image recognition.

In fact, the invention can be presented with, and can analyze, an image having no movement whatsoever: a stationary orchestral leader or a battlefield terrain, for example. In such a case, the REDMANN system would not provide any information about the image whatsoever. The inventive method, in contrast, moves across boundaries, in that images can be analyzed for stationary objects, areas (especially large regions), portions, color, texture, background, infra-red analysis, and movement. By contrast, the REDMANN system can consider only movement of pixels.

The inventive method takes diverse bits of information such as pixel information and "glues" that information onto totally alien information, such as infra-red analysis. In other words, objects such as the turret, gun barrel, or engine of a tank are determined through infra-red analysis, color, texture, pixels, shape, location within the object, etc. This is in contrast to the REDMANN system, which simply sums the coordinates of vertical and horizontal pixel movements, by analyzing vectors. In short, "summing" is not "gluing."

Moreover, the inventive process extracts both simple and complex objects, using a rule-based approach, with image- and/or map-data as inputs, as opposed to REDMANN, which does not use map-data and does not extract simple and complex objects.

In short, this invention yields a much simpler, more effective and direct human-machine-interface-based, object-recognition environment, one in which the programming language is a human-like language. In addition, the invention achieves integration between a rule-based recognition and a match-filter based recognition system, despite the fact that, until now, these methods have been treated as mutually exclusive processes. The methodology of the invention seeks to define imagery with a highly complex, high-level, three-tiered analysis, which analysis provides data that is described in simple human-type language.

SUMMARY OF THE INVENTION

In accordance with the present invention, the fundamental concept of object recognition is to employ a human-like language that is based on the vocabularies used by photo-interpreters in order to write solution algorithms. The present invention is an environment that allows these pseudo-English-based programs to be compiled, after which simple, as well as complex, objects can be extracted. Image- and/or map- data is used as inputs. A grayscale image primitive base map is created, that can be directly converted to regions of pixels in a raw scene of a large area. The process for creating such a primitive base map is by applying a data analysis method, such as simple thresholding (based on size, shape, texture, tone, shadow, or associated features), stable structure segmentation, transforms or hyperspectral analysis.

Based on this human-computer interface, in which pseudo-English is a programming language, the object-recognition system comprises of three major logic modules: (1) the input-data module; (2) the information-processing module, coupled with the above-noted human-computer interface (HCI) module; and (3) the output module, that has a feedback mechanism back to the main information-processing and the input-data module. Using this invented system, one uses three strategies to extract an object: (1) if one can articulate how the object can be used by using the human visual system, one uses a rule-based approach to extract the object; (2) if one cannot articulate as to how an object can be discerned against others, one uses a match-filter approach to recognize the object; and (3) after all the objects are extracted with the first-tier processors, one uses the inventive, human-language-based, programming language of this invention, in order to create compound objects by "gluing" together the already-extracted objects.

The invention provides a mechanism for generating feature primitives from various imagery types for object extraction generalizable to a climatic zone instead of a small image frame such as 512×512 or 1024×1024 pixels. The mechanism simultaneously destroys and creates information to generate a single band image containing spatial feature primitives for object recognition from single band, multi-spectral and multi-sensor imagery. Cartographers and image analysts are thus provided with a single-band imagery for extracting objects and features manually and/or automatically by using expert rule sets.

It would be advantageous to provide a means (a base map) by which terrain features and objects are readily extractable without making object extraction decisions at a pixel analysis level, a tedious, costly and error prone process.

It would be further advantageous to provide a means for extracting features and objects that is generalizable to large geographic regions covering several degrees of the surface of the earth.

It would also be advantageous to provide a one-band scene from a multi-band source, such as a three-band near infrared (NIR) data set, to allow cartographers and/or an automated system to perform feature extraction.

It would further be advantageous to divide feature and object extraction in two stages, Stage 1 being the preparation of a common image map that is generalizable to a large geographic region by using a totally automated, parallel, distributed data processing mode, Stage 2 being the actual process of feature extraction to be performed by a cartographer and/or a machine system using expert knowledge and rule sets.

It is an object of this invention to provide a method of organizing the world of objects in terms of only two categories: those an analyst can articulate with his or her vocabularies as to how to extract it, and the other for which an analyst is better off using a matcher to perform the object-recognition task.

It is another object of this invention to provide a method of "gluing" together already-extracted objects to form new objects by using an abstract, three-dimensional, space-based, spatial-analysis system in which one can develop a solution algorithm with human-like vocabularies, such as "touches", and "surrounded", etc.

It is yet another object of the invention to provide a method of achieving an object-recognition task without requiring tedious, error-prone, difficult-to-understand formal-programming- and operating-system protocol.

It is a further object of this invention to provide a method of extracting additional information when complex objects are extracted, based on already-extracted, single-rule-based objects.

It is yet a further object of this invention to provide a method of preserving the knowledge of "experts".

It is still another object of the invention to provide a method of utilizing an environment in which an analyst's knowledge and object-extraction concepts can be engineered into a machine-compilable program.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A complete understanding of the present invention may be obtained by reference to the accompanying drawings, when considered in conjunction with the subsequent, detailed description, in which:

FIG. 1 is a view of a synthetic aperture radar (SAR), original (input) scene;

FIG. 3 is a display of the feature-extraction result (output) corresponding to the main information-processing module of FIG. 2;

FIG. 5 is a partial listing of the pseudo-English-based, numerical-character recognition algorithm;

DESCRIPTION OF THE PREFERRED EMBODIMENT

Figure 2:
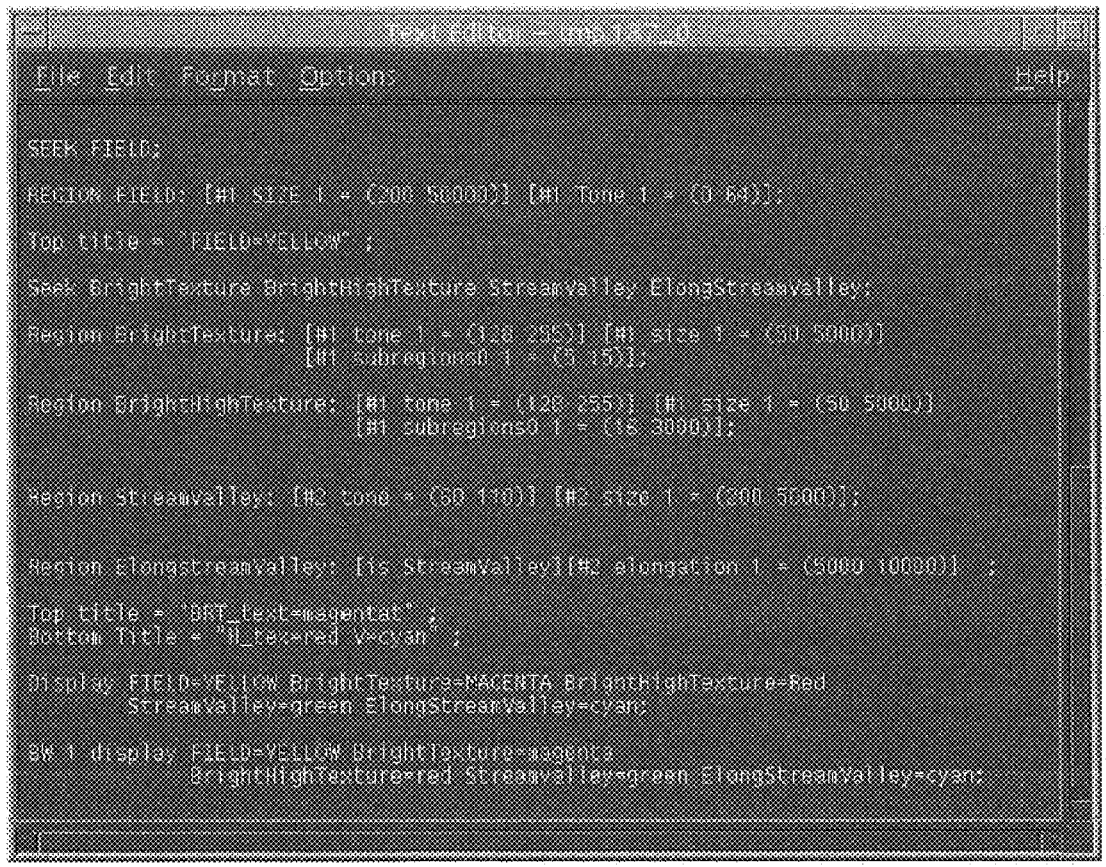
FIG. 2 is a partial code of the information-processing module, with pseudo-English as a programming language, in accordance with the present invention.

Generally speaking, the invention features a method wherein a recognition environment utilizes pseudo-English as a programming language to extract simple and complex objects with image- and/or map data as inputs. Based on this human-computer interface in which pseudo-English is a programming language, the inventive object-recognition system comprises three major logic modules: (1) the input-data module; (2) the information-processing module, coupled with the above-noted human-computer interface (HCI) module; and (3) the output module that has a feedback mechanism back to the main information-processing and the input-data module.

Extracting terrain features with radar imagery has been performed for more than thirty years by using the human visual system. In general, an analyst would know that a cultivated field generates weak SAR (synthetic aperture radar) returns, whereas, a conifer forest would generate strong SAR returns. In terms of photointerpretation terminologies, these two patterns correspond to fine-texture and coarse-texture regions, respectively. Thus, an analyst would most likely determine that he or she can articulate how a cultivated field can be extracted, e.g., based on "low tone and low texture" descriptors. Accordingly, the analyst would most likely use a rule-based approach to perform this feature-extraction task.

In photo-interpretation, analysts are taught to use the following principles to recognize a pattern or object:

1) Tone: for example, the graytone or tone of a body of water is darker than that of a cement surface.

2) Texture: for example, an orchard has a coarser texture than that of a cultivated field.

3) Size: for example, a major league baseball field is larger than a little league baseball field.

4) Shape: for example, a road is usually elongated, whereas the shape of a running track is oval.

5) Shadow: for example, an object of certain height may have an associated shadow.

6) Associated Features: in addition to the shadow example above, a pier is usually associated with a water body.

The majority of objects in images can be recognized by using these principles. Thus, Tone, Texture, Size, Shape and so on are object recognition primitives.

The above-noted Tone, Texture, Size and Shape based principles can be transitioned into attributes of objects in a digital image. Once this step is performed, the principles become the attribute primitives for object recognition.

If an image contains all the spatial units that can be used to form a real world feature or object (such as a forested region, a river, an airfield and so on), then these spatial units are also primitives for object recognition. To differentiate this type of object primitive from the above-discussed Tone, Texture, etc. principle, these spatial units are designated as spatial feature primitives for object extraction.

A set of spatial feature primitives is to be contained in a single-band image. The source from which this spatial-feature-primitive band is generated can be single-band, multispectral, and even multi-sensor data sets. This image is known as a Spatial Feature Image Map (SFIM).

In each SFIM, the graytone levels are generalized into less than 16 categories. Each graytone value is a simulation of a real-world object in a panchromatic image. For example, a Tone value of zero (0) is usually associated with water or shadow; and a Tone value of 200 is associated with a road.

If the source is a panchromatic image, its corresponding SFIM appears to be a result of a simple thresholding analysis. In reality, thresholding is one of many processors that may be required to generate an SFIM. For example, the stable structure method of segmentation (U.S. Pat. No. 5,631,970, hereby incorporated by reference) discloses one method of generating an SFIM.

If the source is a three-band near infrared system, multiple means generate spatial units to be mapped into one single-band SFIM. For example, an algorithm based on the near infrared band is appropriate for water extraction. A vegetation index based band, (nir−red)/(nir+red), can be used to generate vegetation vs. non-vegetation related objects.

The appropriateness of any specific algorithm depends largely on the characteristics of the source imagery. For example, spectral bands compatible to LANDSAT™ regions may require a greenness transform instead of a nir/red based vegetation index band to generate greenness vs. non-greenness related objects. In addition, a water model based on seven LANDSAT bands is usually more effective than one based on a three-band NIR system.

From the above discussion, it is clear that SFIM generation is a generic concept and protocol rather than a specific algorithm, because it can be imagery type specific and geographic region specific. While it appears to be restricted, empirical evidence indicates that a given SFIM generation means is applicable to a very large geographic region. It is this specific large region generalization capability that distinguishes the present invention from the class of conventional image processing methodologies.

To extract an object, a photo-interpreter uses a human language, preferably English, to articulate the rules by which an object is recognized. For example, the photo-interpreter determines that a given object is most likely a water tower, because:

1) the size of the object is medium, 2) the shape of the top of the object is round, and 3) it has certain height due to the existence of shadow nearby. (Equation 9)

The above-noted "size," "shape," and "height represented by shadow" are within the lexicon of photo-interpreters. The syntax by which the words are integrated into a meaningful concept is mentally defined by the user. Usually, the rules are additive and spatially associative. For the Equation (9) human concept to become a computer compilable code, a computer language must understand these words and syntax. To fulfill this requirement, such a new computer language is provided, based on the lexicon plus syntax of photo-interpreters to convert their conceptual algorithms into computer compilable code. For example, the following code is equivalent to Equation (9):

---
(Equation 10)
---
```
Seek mid_size mid_size_round
         mid_size_shadow pos_water_tower ; /* object names are
declared*/
Region mid_size : [#0 size 1 = (100 500)]; /*object 1 is
defined*/
Region mid_size_round: [is mid]
    [#0 linearity 1 = (0 3000)]; /*object 2 is defined */
Region mid_size_shadow: [#0 tone 1 (0 80)]
                    [#0 size 1 (100 500)]; /*object 3 is
defined*/
Region pos_water_tower: [is mid-size-round] /*object 4 is
defined*/
    [within 15 mid-size-shadow]
```
---

Figure 8:
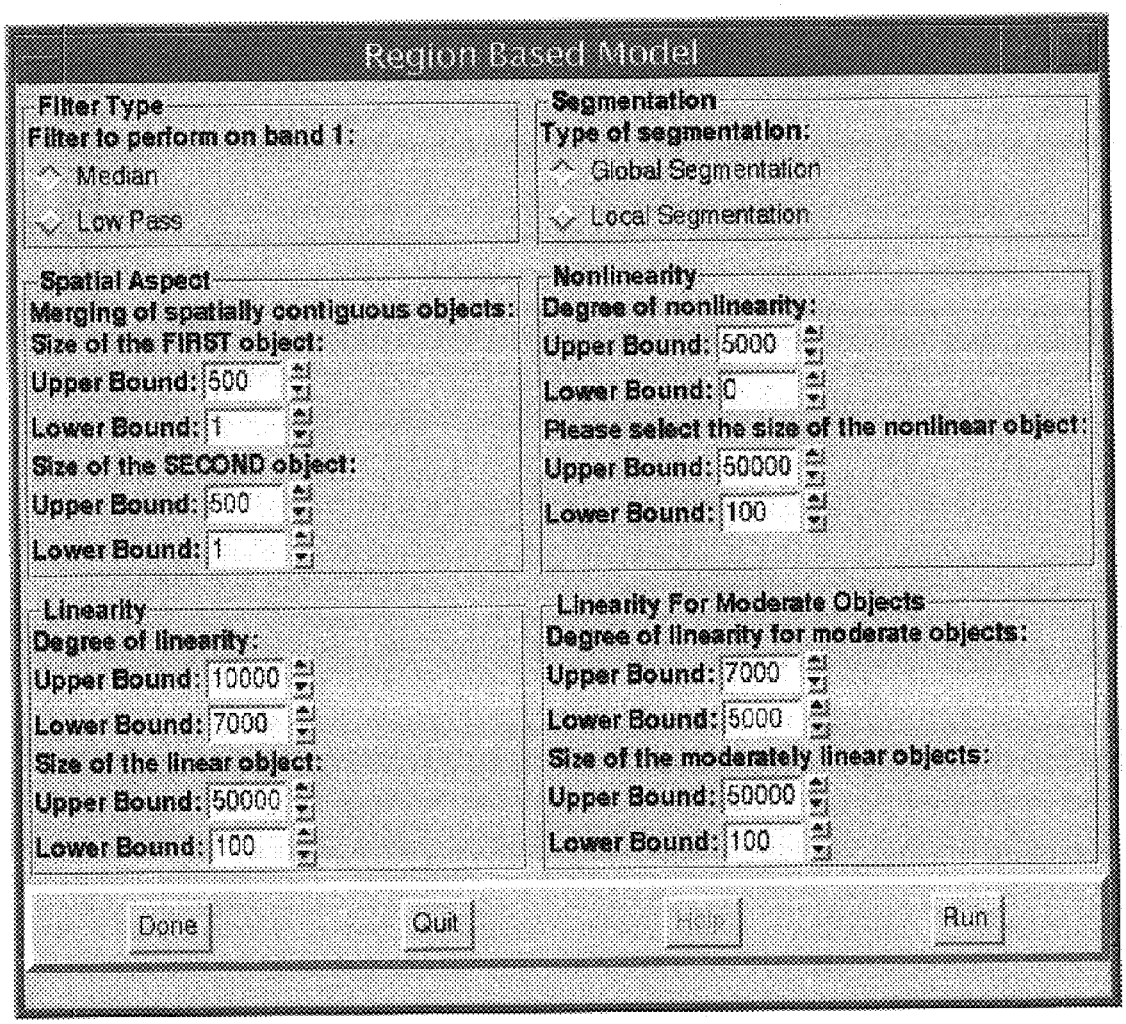
FIG. 8 depicts a mechanism for generating code.

In Equation (10), the words are self-explanatory: they are English vocabulary. Similar to the syntax of photo-interpretation, the syntax in Equation (10) is simple. For example, terms between two brackets [ ] are equivalent to English "and." The colons and semicolons represent rules to be followed. In fact, this language is developed to such an advanced stage that composing a rule set can be done by using a graphic user interface (GUI) rather than a conventional text editor as shown in FIG. 8.

A U.S. Geological Survey topographic quadrangle (quad) covering 7.5 minutes of longitude and latitude of the earth surface can be considered a unit of analysis. Sixteen quads cover a region of 0.5 degrees (approx. 55 kilometers), as illustrated in Table VII below.

TABLE VII

Sixteen Quads

```
|-------|-------|-------|-------|
                                    7.5'
-----------------------------------
                                    7.5'
-----------------------------------
                                    7.5'
-----------------------------------
                                    7.5'
|-------|-------|-------|-------|
  7.5'    7.5'    7.5'    7.5'
```

Table VIII shows the number of pixels required to cover a distance of 55 kilometers by various resolution levels.

TABLE VIII

Resolution vs. Number of Pixels

| Sensor System Kilometers | Ground Resolution | Covering 55 |
|---|---|---|
| LANDSAT | 30 m/pixel | 1,834 |
| SPOT Pan | 10 m/pixel | 5,000 |
| 5-meter Pan | 5 m/pixel | 11,000 |
| 2-meter System | 2 m/pixel | 27,500 |
| 1-meter System | 1 m/pixel | 55,000 |

A two-meter resolution image for processing, using conventional means, dictates an appropriate sized image of 1024×1024 pixels. In this case, the area coverage is a distance of 2,048 meters on one side of the square region, equivalent to 0.018618 degrees on the earth coordinate system, or 3.7 percent of a one-half degree. This comparison is shown in Table IX.

TABLE IX

Spatial Dimension of A Scene with 2 m/pixel Spatial Resolution

| Pixel Number | Resolution | Ground Distance | Fraction of a Degree |
|---|---|---|---|
| 1024 pixels | 2 meters | 2048 meters | 1.8618% in distance |
| 1024 × 1024 | | 2048 × 2048 pixels | 0.03466% of one degree; 2885 images |

In terms of a two dimension space, a region covered by 1024×1024 pixels with a spatial resolution of two meters is equivalent to only 0.03466 percent of one degree on the earth surface. In other words, approximately 2,885 images are needed to cover a one-degree region, each image having 1024×1024 pixels.

Suppose that a conventional image processing and pattern recognition approach to extract objects from 2885 images requires two minutes of processing time for each image. Approximately 63 hours will be needed to complete a task which may be devoted to extracting only one target object. The second task will require the same amount of hours. A more troubling aspect of the problem, using a conventional approach to perform this task, lies in the fact that a given object extraction algorithm may not be applicable to even the nearest neighbor of the region where the algorithm originates. Therefore, the above-noted 63 hours per task is based on the assumption that a given object extraction algorithm is generalizable within a one degree region, which is usually not the case.

On the other hand, the current inventive approach to the above problem is to divide the complete set of object extraction tasks into two stages. Stage 1 generates only the spatial feature image map that contains the needed object extraction primitives using a totally automated mode. Stage 2 extracts the target object using a specialized object recognition rule set.

EXAMPLE

A set of images, panchromatic and near infrared, was obtained, covering the New River Inlet Quad of North Carolina. Each of the three air photos was digitized at the resolution level of 600 dots per inch, resulting in a spatial resolution of approximately 1.7 meters per pixel on a linear scale. With 60 percent overlap and 30 percent side lap between adjacent air photos, the 7.5 minute topoquad was covered by about 50 images, each being 1024 by 1024 pixels. In this format, about 200 pixels of overlap exist between adjacent cells.

Figure 9:
FIG. 9 is an original NIR scene.

For this experiment, I developed two SFIM generation systems: the first one for the panchromatic images, and the second one for the near infrared images. FIG. 9 shows an original infrared scene, and FIG. 10 its SFIM counterpart.

The above-noted SFIM generation system was developed from a sample of scenes within the total set of 55 images. I then used each system to generate 55 SFIM scenes using a totally automated mode. While each run required up to four minutes using a SUN UltraIO™ computer system, it should be understood that the total amount of time for processing 55 images can be distributed to many computers. If the number of computers is 55, of course, the entire set of 55 images can be processed within only four minutes.

The validity of the invention should be based-on whether each SFIM contains sufficient spatial feature primitives to extract a specific object. As an example, the runway in the quadrangle was used as a target object, as shown in FIG. 9.

The test included designing a rule base to extract the runway in one of the 55 scenes, and second, testing the runway extraction rule base against the entire 55 images covering the particular 7.5 minute quadrangle.

My test results show that:
a) for each object extraction run, about 30 seconds were needed for the panchromatic images;
b) for the same task using a 3-band NIR system, each run required about 25 seconds; and
c) the runway was correctly extracted with only one false alarm in the entire set of 55 images applicable to panchromatic and NIR domains.

To test the stability of the invention, I used the same SFIM generation systems against the following data sets:
a) 5-meter panchromatic images covering a region of one-half degree in longitude and latitude or 55,000 meters in one dimension;
b) SPOT Panchromatic images of 10 meter resolution for a slightly smaller region; and
c) 1.2 meter resolution NIR images covering the design set area of 7.5 minutes.

The results indicate that the SFIM generation system for panchromatic images remains unchanged for all panchromatic images of varying resolution levels. In technical terms, this SFIM algorithm is invariant under spatial resolutions. Moreover, the SFIM generation system for NIR imagery is invariant under spatial resolutions.

To prove the validity of this resolution-invariant property of SFIM generation systems, I performed object extraction using runways in the area as a test object. By using the same test procedures applied to the 7.5 minute quad area, I discovered that all of the apparent runways in the one-degree area were extracted without error of omission, and that false alarms were minimal in FIG. 10.

TABLE X

Performance of Runway Detection By Sources

| Source | Spatial Extent | Correct Detection | False Alarms |
|---|---|---|---|
| LANDSAT | 0.63 × 0.61 sq deg. | 3 or 100% | 1 |
| SPOT | 0.37 × 0.38 sq deg. | 2 or 100% | 0 |
| 5-meter pan | 0.5 × 0.5 sq deg | 2 or 100% | 0 |
| 1.7 meter pan | 7.5 × 7.5 minutes | 1 or 100% | 1 |
| 1.7 meter NIR | 7.5 × 7.5 minutes | 1 or 100% | 1 |
| 1.2 meter NIM | 7.5 × 7.5 minutes | 1 or 100% | 0 |

Figure 4:
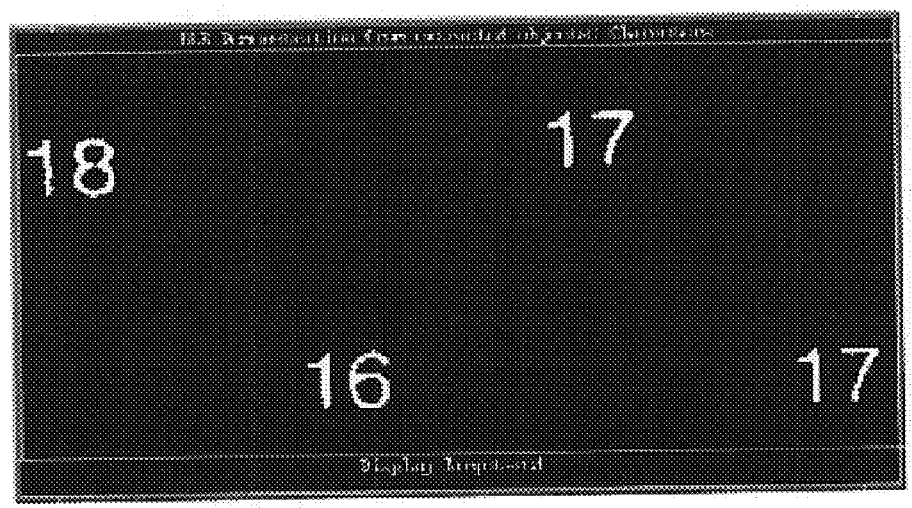
FIG. 4 is an input image of a sub-scene of a digital chart.
Figure 6:
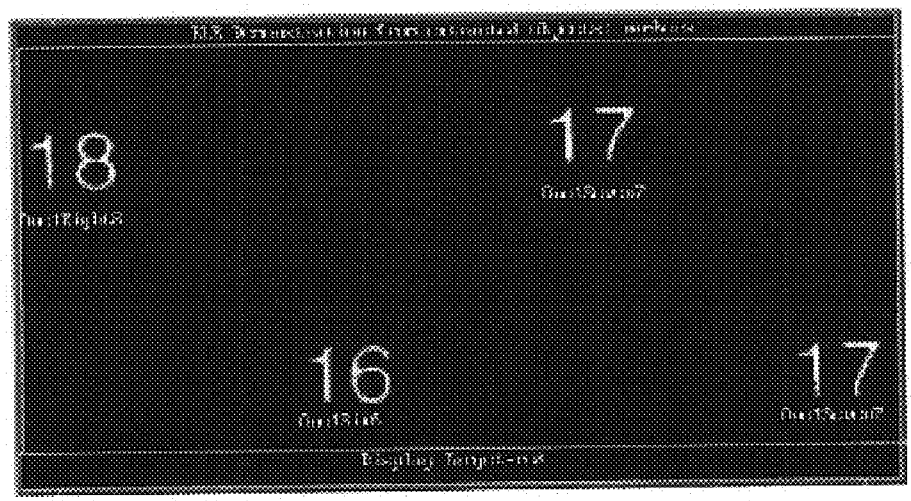
FIG. 6 is a view of an output showing that four one-digit numbers are recognized, i.e., 1, 6, 7 and 8.
Figure 7:
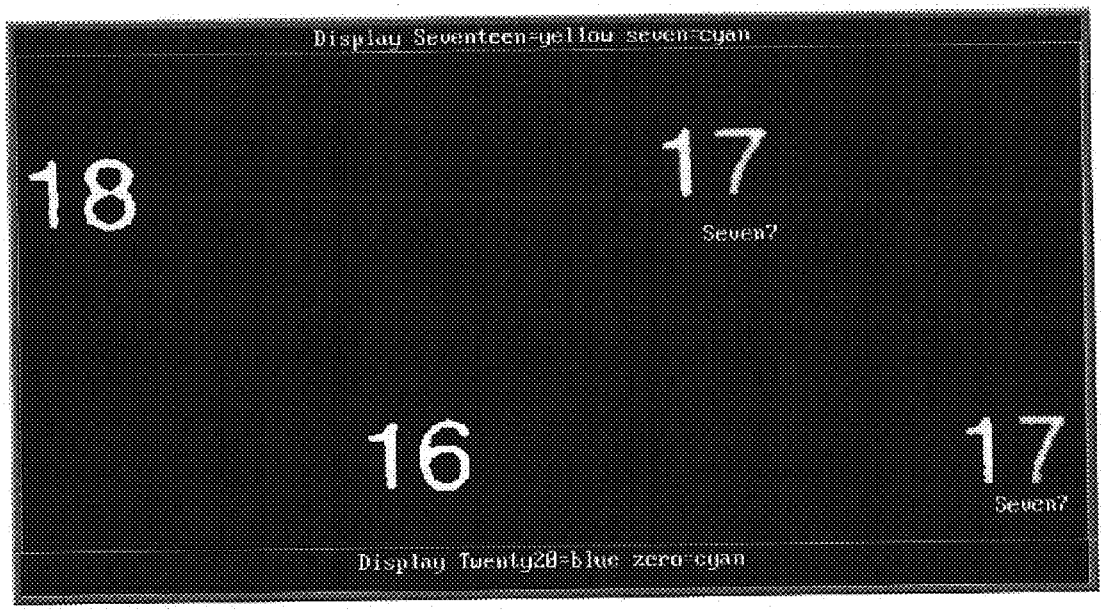
FIG. 7 is a view of the next output, showing that one two-digit number, i.e., 17, has been recognized.

Referring to FIG. 4, the image of a scene showing sounding-depth data is illustrated. An analyst would most likely determine that it would be extremely difficult to write a rule-based program to extract either one-digit or two-digit numbers, simply because he or she is not able to articulate as to how to differentiate ten one-digit numbers, using size- and shape-descriptors. Thus, the best strategy is to employ a match-filter to recognize each one-digit number first, and then pass the results back to a rule-based system.

Once the analyst has the ten one-digit numbers as existing objects, he or she would know how to articulate a process by which a two-digit number can be extracted. For example, the number seventeen (17) is composed of two one-digit numbers; in addition, one is located "left of" seven, within a "short" distance. At this point, the analyst would most likely decide that this two-digit number-extraction task can be accomplished by using a rule-based system, yielding a hybrid-matcher-plus-rule-based feature-extraction system. This combined, two-system approach is feasible because the invention, a human-computer interface (HCI), provides a means by which any extracted object, be it derived from a rule-based or a match-filter-based classifier, can be fed back to the rule set in the HCI as the basis for extracting additional objects.

While the three-module, information-processing system allows one to recognize an object with image- and/or map-data, one of the main purposes of this invention is to use a pseudo-human language, based on the vocabularies of photointerpreters, as a programming language in order to convert an analyst's feature-extraction concepts into computer-compilable, object-extraction programs. Thus, it is appropriate to list the key vocabularies of this programming language.

An Image-Cube-Based Processing Environment

With multi-polarized, SAR images and hyperspectral imagery for information extraction, one has an image cube as input data. The vast majority of conventional, image-exploitation environments, however, extract the information from one plane at a time. While the M-pyramids technique (Tanimoto, 1980) and a feature pyramids method (Levine, 1980) appear to extract information in an image cube, these approaches are designed to create one final, "information-rich" scene for feature extraction. The word "pyramids" also implies that one uses a cone structure to extract information. Thus, these pyramidal approaches do not implicitly use multiple planes to extract information in a framework in which all of the input planes can "talk to each other".

Information extraction with this image-cube environment is achieved by using an advanced human-computer interface (HCI) module, in which one uses a human-like language, such as pseudo-English, as a programming language.

Information processing is achieved by using two text files as follows:

a. The Batch File:

The proposed HCI module uses script files to control the entire process of object recognition by using multiple layers as input data. The first file is called simply a ".bat" file, because it is, in reality, a batch file that initiates an object-extraction process. For example, note the following ".bat" file—ATRtestl.bat:

| (Equation 11) | | | | | | | |
|---|---|---|---|---|---|---|---|
| IMaG.exe | ATRtest1(.att) | /infiles | Layer 1 | Layer 2 | Layer 3 | \Outfiles | Output 1 |
| 1 | 2 | 3 | 4 | 5 | 6 | 7 | 8 |

The components of Equation (11) are as follows:

(1) IMaG.exe is the main environment in which one uses an analyst-specified, expert system—the next item—to extract the intended objects.
(2) ATRtestl.att is a text file, written with conventional, alphanumerical characters that control that entire, object-extraction process.
(3) /Infiles identifies the input scenes by the order of the input sequence.
(4) through (6):
  (4) is the first input file. In the .att file, (2) above, it is recognized by the name of "band 1", or "1" after a feature name, such as tone 1.
  (5) is the second input file. In the .att file, it is identified as Band 2. To use it, [tone 2=(200 255)] or [size 2=(1 10)] is written.
  (6) is the third input file. The rest are the same as those in Band 2.
(7) /Outfiles identifies the existence of an output file by the .att file.
(8) Output 1 is the data file name of the first output from the expert system—.att file.

b. The Expert System (.att) File with Pseudo-English as a Programming Language:

The second control file accompanying the first (.bat) file identified as an .att file is the expert-system file that specifies the rules with which one extracts an object. The structure of this human-computer interface (HCI) module contains the following subsystems:

(i) System Communication and Initial, Full-Scene Segmentation Processors For example, an HCI starts with these commands:

| (Equation 12) | |
|---|---|
| Line 1 | Bands = 4; |
| Line 2 | Band 4 = :1: + :2: + :3:; |

| -continued | |
|---|---|
| (Equation 12) | |
| Line 3 | Initial Cutoff 1 = 1; |
| Line 4 | Initial Cutoff 2 = 2; |
| Line 5 | Initial Cutoff 3 = 3; |
| Line 6 | Initial Cutoff 4 = 60 percent; |

| -continued | |
|---|---|
| (Equation 12) | |
| Line 7 | Segmentation Type 1 = local; |
| Line 8 | Segmentation Type 1 = local; |
| Line 9 | Segmentation Type 1 = local; |
| Line 10 | Segmentation Type 1 = local; |

Line 1 informs the IMaG.exe system that there are four input layers: the first three files are from the .bat file, and the fourth file is created by Line 2.

Line 2 creates the fourth layer by taking a sum of the previously-identified three files.

Line 3 through Line 6 specify how each scene or layer is to be segmented.

Line 7 through Line 10 specify that one of the segmentation algorithms called "local" is to be used to perform a full-scene segmentation.

After a set of segmentation analyses is completed, one can use a region as opposed to a pixel as a potential object. Of course, one still has an option to use a pixel as a potential object. In addition, one can create a rectangle from extracted pixels as a potential object. Thus, three potential object types can be created: region, pixel and rectangle.

(ii) Object Extraction using Tone, Texture, Size, Shape and Associated Features

The second HCI subsystem is designed to extract objects by using as a programming language pseudo-English having vocabularies that correspond to those used by a photo-interpreter. From a standard textbook on air photo interpretation, it is an undeniable fact that a photo-interpreter or an image analyst uses such vocabularies to articulate how he or she derives the rules by which an object is extracted, i.e., tone, texture, size, shape, shadow, pattern, and associated features. For example, a possible water tank is to be extracted by using a high-resolution panchromatic image, because:

| (Equation 13) | |
|---|---|
| Rule 1: it is small object; | /* A Size Principle */ |
| Rule 2: it is a round object; and | /* A Shape Principle */ |
| Rule 3: it is associated with a shadow. | /* An Associated Feature Principle */ |

How does the photo-interpreter communicate with a computer? The communication means by which a human analyst communicates with a computer is generally called a man-machine interface. Conventionally, this man-machine interface is generally interpreted as an image display or a graphic display. Recently, this man-machine interface has been interpreted as a graphic-user-interface (GUI), a typical example of which is a set of graphic icons for a user to "point and click". In reality, both of these graphic devices do not permit a photo-interpreter to communicate with the computer effectively, because the photo-interpreter's language (with vocabularies like size, shape, pattern, etc.) cannot be understood by a computer. Intended for removing this communication barrier, the proposed HCI uses a variation of a human language for a photo-interpreter to "talk to" the computer directly without having to rely on a third-party interpreter, which is usually a C or C++ programmer. How are the above-listed three rules in Equation 13 translated? In order to provide an answer to the above question, the proposed HCI is written:

---
(Equation 14)
---

Line 1 Seek Small Round_Small Shadow Possible_tank;
Line 2 Region Small: [Size I = (10 50)];
Line 3 Region Small_Round: [is Small] [Linearity 1 = (0 3000)];
Line 4 Region Shadow: [Tone 1 = (0 10)];
Line 5 Region Possible_tank: [is Small_Round] [Within 20 Shadow];
Line 6 Display Possible_tank = magenta;
Line 7 File Display Possible_tank = magenta.

---

Line 1 informs the IMaG.exe system that the analyst would like to extract the following objects specified as (1) Small, (2) Small_Round, (3) Shadow and (4) possible_tank.

Line 2 is equivalent to this sentence: "A Small has Size greater than 10 and has Size less than 50. "

Line 3 is equivalent to this sentence: "A Small round has Size greater than 10 and has Size less than 50 and has Linearity less than 3000." Its shorter form is: "A Small_round is Small and has Linearity less than 3000."

Line 4 is equivalent to "A Shadow has Tone less than 10."

Line 5 is equivalent to "A Possible_tank is Small_Round and is located within 20 (pixels) from a Shadow."

Line 5 commands the computer to display the extracted object.

Line 6 commands the computer to output the extracted object in terms of an image file, in which the object has a DN (digital number) value equivalent to magenta and its background pixels are zero-value pixels. Compatible with the .bat file, the name of this file is "Output1".

It is believed that, with this HCI system, the photo-interpreter can extract an object as he or she conceptualizes and articulates it by using his or her own ad language. Thus, it is believed that this HCI system is an effective man-machine interface system and is much superior to a conventional, mere display system or an icon-based GUI.

Key Vocabularies Centered on a Photo-interpreter's Object-Recognition Language

As noted earlier, as a general rule, a photo-interpreter uses the following principles to extract an object: (1) tone (a spectrum); (2) texture (spatial variation of tones); (3) size; (4) shape; (5) shadow (detection of vertical objects); (6) pattern (geometry and density); (7) associated features (contextual information); (8) stereoscopic characteristics (height), if available.

It should be clear that the vocabulary chosen for illustrative purposes herein is related to the physical phenomenon known as visual images. However, if other physical phenomena (e.g., flavors, odors, spectrography, sounds, dermatology, etc.) are to be analyzed for "object" recognition, then an appropriate specialized vocabulary will be used. If these vocabularies or combinations thereof are compilable, then a new computer language is invented.

Table XI below gives a partial list of vocabularies that correspond to each of the above object-recognition, key principles, in addition to the system-related vocabularies discussed thus far.

TABLE XI

Main Vocabularies used in the Inventive Object-Recognition System

| | | |
|---|---|---|
| (1) Tone Principle | Tone | DN or average DN value of a region |
| | Maxtone | Maximum DN value in a region |
| | Mintone | Minimum DN value in a region |
| (2) Texture Principle | Texture | 100 times the mean first neighbor contrast |
| | Deviation | 100 times the mean deviation of the tome of the entire region |
| | Diversity | 1000 × (Deviation/texture - 1) |
| | Subregions | Number of regions prior to being merged as one uniform region |
| (3) Size Principle | Size | number of pixels in a region |
| (4) Shape Principle | Convolution | A measure of compactness of a region, ranging from 0 to 10,000. A circular region will have a small number of convolution. |
| | Elongation | This detects a long and thin region. Its measure ranges from 0 to 10,000. |
| | Constriction | This is sensitive to regions which have an "hourglass" shape somewhere on their boundary. |
| | Linearity | This is sensitive to shapes which are long, thin and straight-10,000 units of linearity. |
| | Aspect | This is 1000 times the natural log of the ratio of the second order (2.0) central-row moment to the second order central-column moment, plus 10,000. |
| | Inclination | This is counterclockwise angle in degree (0 to 180) of the principle axis relative to the horizon. |
| (5) Pattern and Associated Features | Above/Below | |
| | Left/Right | The relative positions of the centroids of regions being examined. |
| | Inside | The centroid of a region lies inside or on the circumscribed rectangle of at least one object of the named class. |

TABLE XI-continued

Main Vocabularies used in the Inventive Object-Recognition System

| | |
|---|---|
| Outside | At least one object of the name type is Inside the region being tested. |
| Adjacent | The region's circumscribed rectangle touches or overlaps that of at least one object of the named type. |
| Within | The centroid of the region is within the specified Euclidean distance of the centroid of at least one object of the named type. |
| Touches | Any pixel of this region corresponds to or is next to a pixel belonging to an object of the named type. |
| Surrounds | For any object of the name type, all of its exterior border pixels are a member of the name type. |
| Surrounded | Similarly defined as above. |
| Approaches | The closest approach of the perimeter of this region to the perimeter of any object of the named type is less than or equal to the specified distance. |
| is | An equivalent statement. Usually used as a means to build a compound object. |
| Not_ | A reversed condition associated with certain adjectives, such as Not_Inside. |

Table XI describes only a partial, annotated list of vocabulary used for an object extraction language. Table XII, however, provides a more comprehensive list of vocabulary for the computer language.

TABLE XII

A. Image Processing Component

Bands
Copy
Modify
Log
SQRT
Expand
Ignorm
Histeq
Lopass33 or 55
Median33 or 55
IQ33 or 55
Hipass33
Confidence
Delayed by
Buffered

B. Scene Generalization

Cutoff
Local
Global
Init
Merge
Unmerge
Split
Chop
Width
Prim
Size
Stop1
Penalty
Penalize
End Penalty
SPF

C. Object Recognition

Seek
Pixel
Density
Region
Rectangle
Border
Size
Tone

TABLE XII-continued

Maxtone
Mintone
Texture
Deviation
Diversity
Linearity
Elongation
Convolution
Constriction
Aspect
Inclination
Rcent
Ccent
Rmax
Rmin
Cmax
Cmin
is
not
If
Above
Below
Inside
Outside
Adjacent
Within
Touches
Surrounds
Surrounded
Approaches
Not_
Class
Partial

D. Image Output

Display
BW
White
Blue
Cyan
Yellow
Magenta
Red
Brown
Green
Dimred
Dimgreen
Dimblue
Pixtone
Top TABLE XII-continued Bottom
Title
Guard
Center
Label
Solid Model
Activation
Azimuth Two object-extraction examples that use these photo-interpreters' vocabularies are given in FIGS. 2 and 5. The vehicle used for performing this object-recognition process by using a human-like language centered on concepts that are utilized by photo-interpreters is the IMaG System described in an allowed patent, bearing Ser. No. 08/066,691 and filed on May 21, 1993.

The invention provides a mechanism for generating feature primitives from various imagery types for object extraction generalizable to a climatic zone instead of a small image frame such as 512×512 or 1024×1024 pixels. The mechanism simultaneously destroys and creates information to generate a single band image containing spatial feature primitives for object recognition from single band, multi-spectral and multi-sensor imagery. Cartographers and image analysts are thus provided with a single-band imagery for extracting objects and features manually and/or automatically by using expert rule sets.

Figure 10:
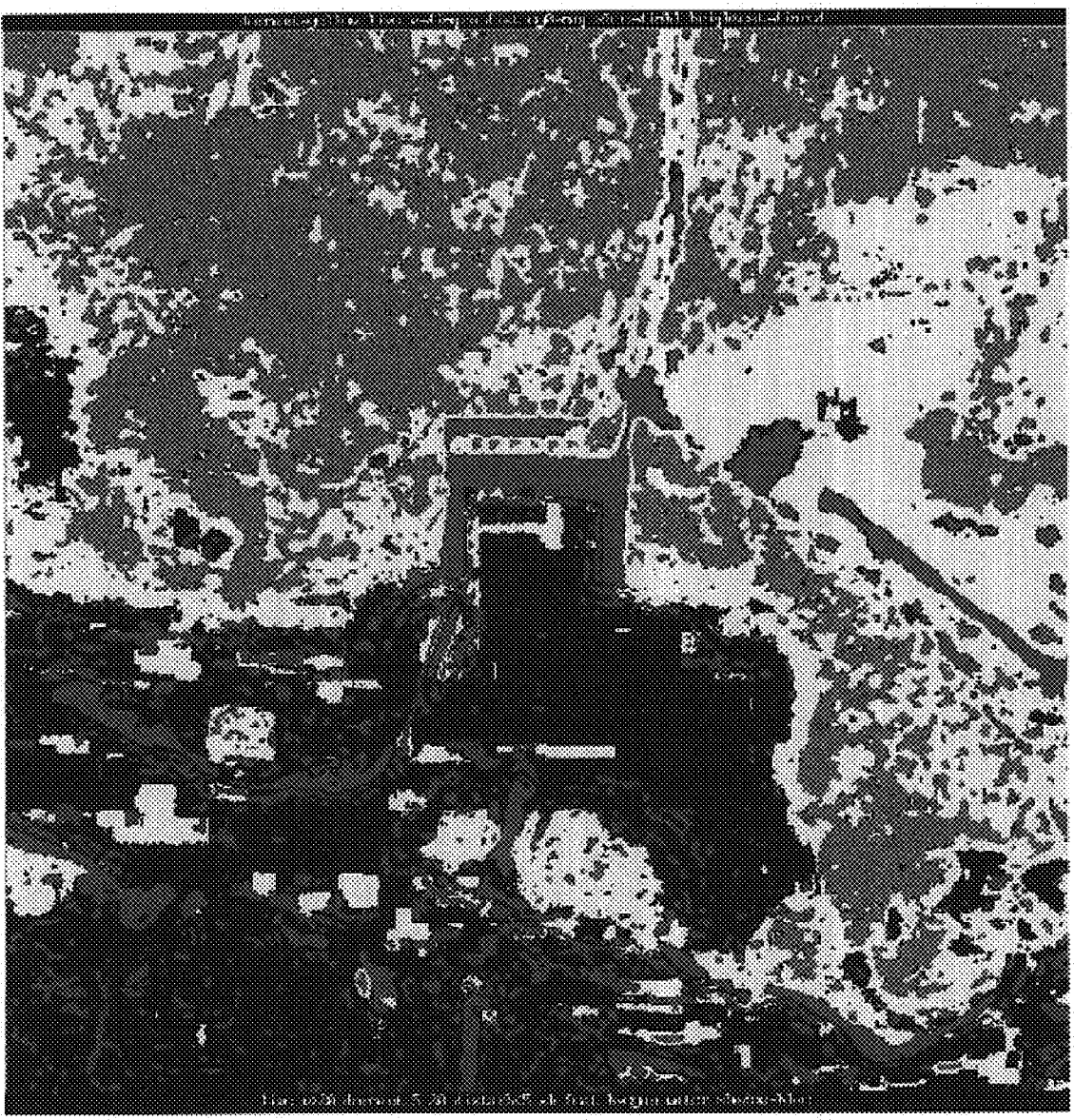
FIG. 10 is an SFIM counterpart of the scene shown in FIG. 9.
Figure 11:
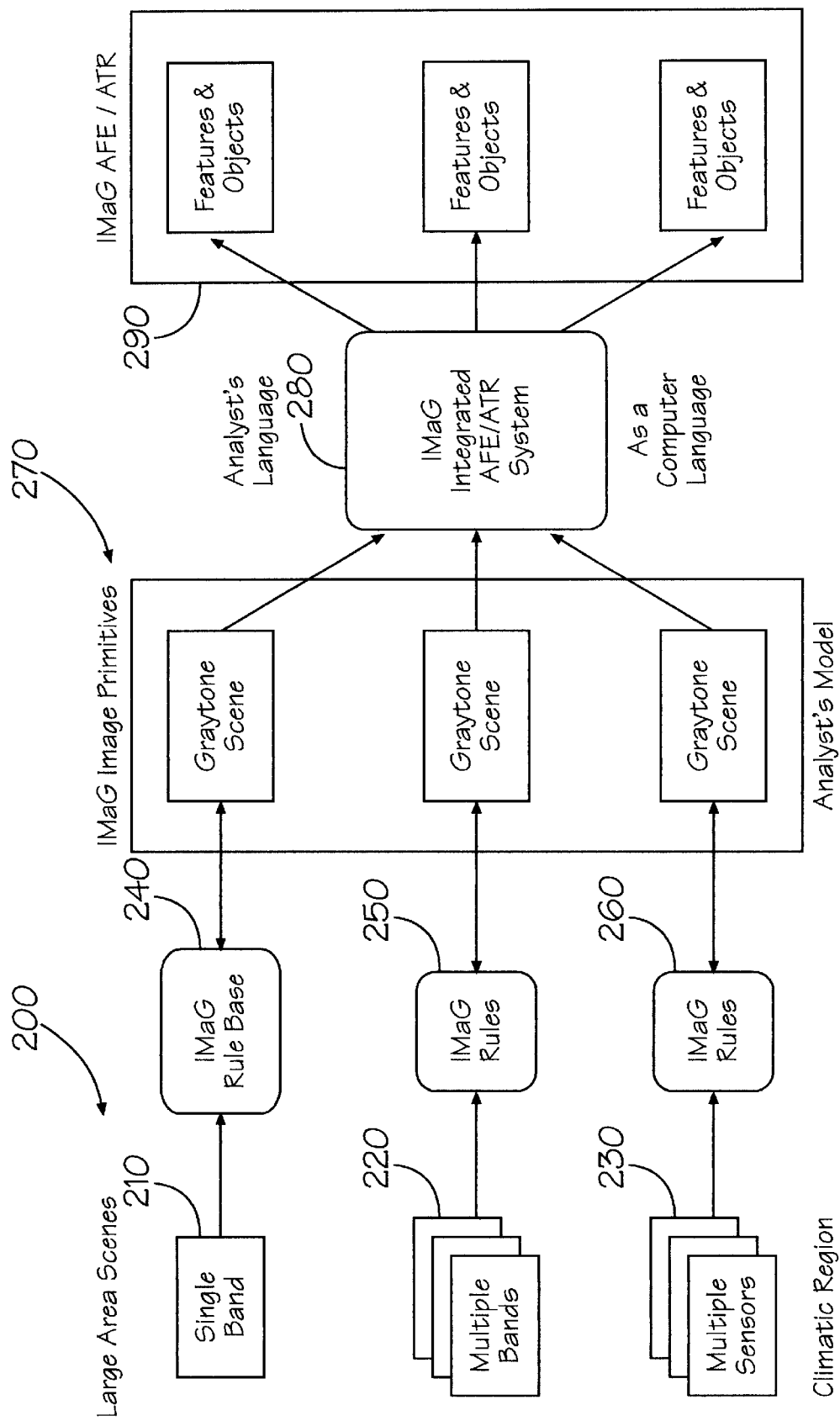
FIG. 11 is a block diagram of the architecture of the IMaG system of the present invention.

This architecture for converting raw images to image primitives and subsequent extraction or recognition by using a new language and data analysis paradigm is illustrated in FIG. 11. Large area scenes 200, which could have been created as a single band 210, multiple bands 220, or by the use of multiple sensors 230 are applied to respective rules in a rule base 240, 250, 260. The output from these rules 240, 250, 260 is input to an analyst's model of one or more image primitives 270. Image primitives comprise graytone scenes, an example of which is shown in FIG. 10. It should be understood that the rules 240, 250 and 260 need not be accessed solely by single band 210, multiple bands 220 and multiple sensors 230, as described hereinabove. In fact, the image primitives 270 can be used as input to the respective rule bases. In such cases, the output of rules 240, 250, and 260 can result directly in identifying and/or extracting features and objects 290. Therefore, the rules in 240, 250, 260 and 280 are generic. Moreover, raw images 210, 220, 230 can be combined with primitives 270 and applied to system 280 to generate the result 290.

The image primitives 270 are applied to the analyst's human-readable language 280 in accordance with the invention. Once the language 280 processes these primitives, features and objects 290 can be extracted from the image originally provided in single band 210, multiple band 220 and multiple sensor 230 form. The extracted features and objects 290 can also be fed back into the analyst's language 280 to generate new objects.

Since other modifications and changes varied to fit particular operating requirements and environments will be apparent to those skilled in the art, the invention is not considered limited to the example chosen for purposes of disclosure.

Thus, it can be seen that the methodology of the invention can be adapted to process other physical phenomenon, in addition to images, such as sounds, textures, fragrances, and flavors. Merely by providing appropriate physical phenomenon models and descriptors to the system, the inventive method can be used to analyze and extract portions of such physical phenomena.

What is claimed is:

1. A method of extracting an object from a raw image representing a large area comprising a plurality of pixels or from data representative thereof, the steps comprising:
   a) creating a grayscale image primitive base map that can be directly converted to regions of pixels in a raw scene of a large area by applying at least one data analysis method;
   b) recognizing an object in a predetermined computer-compilable photo-interpreter language;
   c) determining whether said object is articulatable by using predetermined descriptors stored in a memory;
   d) matching said object to a known, articulatable, physical-phenomenon model, if said physical-phenomenon is not articulatable;
   e) extracting recognizable features from said grayscale image, if said object is articulatable; and
   f) forming a composite of features extracted in steps (d) and (e).

2. The method for extracting an object in accordance with claim 1, wherein said physical-phenomenon model is stored in a library.

3. The method of extracting an object in accordance with claim 1, wherein said raw scene can be more than one band or derived from multiple sensors.

4. The method for extracting an object in accordance with claim 1, wherein said data analysis method is one from the group of:
   a) simple thresholding based on at least one from the group of: i) size, ii) shape, iii) texture, iv) tone, v) shadow, and vi) associated features;
   b) stable structure segmentation;
   c) transforms; and
   d) hyperspectral analysis.

5. The method for extracting an object in accordance with claim 1, wherein said recognizing step (b) is performed by utilizing a pseudo-English-language program.

6. The method for extracting an object in accordance with claim 5, wherein said pseudo-English-language program comprises key words, terms and syntax.

7. The method for extracting an object in accordance with claim 1, wherein said extraction step (e) is performed by utilizing a pseudo-English-language program.

8. The method for extracting an object in accordance with claim 1, wherein said pseudo-English-language program comprises key words, terms and syntax.

9. The method for extracting an object in accordance with claim 1, wherein said physical phenomenon model comprises visual images.

10. A method for recognizing a physical phenomenon, the steps comprising:
    a) creating a grayscale image primitive base map that can be directly converted to regions of pixels in a raw scene of a large area by applying at least one data analysis method;
    b) recognizing an object in a predetermined computer-compilable photo-interpreter language;
    c) determining whether a physical phenomenon is articulatable by using predetermined descriptors stored in a memory;
    d) matching said physical phenomenon to a known, articulatable, physical phenomenon model, if said physical-phenomenon is not articulatable; and
    e) extracting recognizable features from said physical phenomenon.

11. The method for recognizing a physical phenomenon in accordance with claim 10, wherein said physical phenomenon model comprises images.

12. The method for recognizing a physical phenomenon in accordance with claim 10, wherein said physical phenomenon model comprises sounds.

13. The method for recognizing a physical phenomenon in accordance with claim 10, wherein said physical phenomenon comprises fragrances.

14. The method for recognizing a physical phenomenon in accordance with claim 10, wherein said physical phenomenon comprises textures.

15. The method for recognizing a physical phenomenon in accordance with claim 10, wherein said physical phenomenon comprises flavors.

16. The method of extracting an object in accordance with claim 1, wherein said creating a grayscale image step (a) is performed simultaneously with destroying at least a portion of information representative of said raw scene.

* * * * *